US012393447B2

(12) United States Patent
Soliman et al.

(10) Patent No.: US 12,393,447 B2
(45) Date of Patent: *Aug. 19, 2025

(54) DISTRIBUTED COMMUNICATION BETWEEN DEVICES

(71) Applicant: Apple Inc., Cupertino, CA (US)

(72) Inventors: Ahmed M. Soliman, Munich (DE); Ayman F. Naguib, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 17/951,420

(22) Filed: Sep. 23, 2022

(65) Prior Publication Data

US 2024/0103904 A1 Mar. 28, 2024

(51) Int. Cl.
G06F 9/48 (2006.01)
G06F 9/54 (2006.01)
G06F 21/44 (2013.01)

(52) U.S. Cl.
CPC .......... *G06F 9/4881* (2013.01); *G06F 9/546* (2013.01); *G06F 21/44* (2013.01)

(58) Field of Classification Search
None
See application file for complete search history.

(56) References Cited

U.S. PATENT DOCUMENTS

| 11,875,349 B2 | 1/2024 | Gosset et al. | |
| 2005/0108326 A1* | 5/2005 | Tuttle | D06F 95/00 68/12.01 |
| 2005/0212842 A1* | 9/2005 | Katsumata | B41J 29/393 347/14 |
| 2006/0075092 A1* | 4/2006 | Kidokoro | H04L 69/329 709/224 |
| 2011/0149755 A1* | 6/2011 | Gandhewar | H04L 43/0823 370/252 |

(Continued)

FOREIGN PATENT DOCUMENTS

| CN | 107659808 A | * | 2/2018 | ......... H04N 21/4425 |
| CN | 113645105 A | * | 11/2021 | .......... F21V 23/0407 |
| CN | 114070747 A | * | 2/2022 | ............. H04L 43/50 |

OTHER PUBLICATIONS

U.S. Appl. No. 17/951,423, "Non-Final Office Action", Apr. 9, 2025, 13 pages.

(Continued)

*Primary Examiner* — Charles E Anya
(74) *Attorney, Agent, or Firm* — Kilpatrick Townsend & Stockton LLP

(57) ABSTRACT

Techniques are described herein for effectuating a transaction by an intermediary. An example method can include receiving a first message from a second device, the first message comprising a request for a first item, wherein the first message is received by a backend process executing on the first device. A second message that includes a request for a first information associated with the first item, can be transmitted. A third message comprising the first information associated with the first item can be received. A fourth message comprising a request to initiate a transaction for the first item can be transmitted to a third device. A fifth message can be received from the third computing device, the fifth message comprising a confirmation of the transaction based at least in part on the fourth message.

20 Claims, 10 Drawing Sheets

(56) References Cited

U.S. PATENT DOCUMENTS

| | | | |
|---|---|---|---|
| 2013/0173539 A1 | 7/2013 | Gilder et al. | |
| 2017/0175433 A1* | 6/2017 | Kang | G06Q 10/08 |
| 2018/0211176 A1* | 7/2018 | Khurshudov | H04L 67/12 |
| 2018/0341917 A1* | 11/2018 | Atwal | G06Q 20/12 |
| 2018/0364135 A1* | 12/2018 | Eriksson | G01M 99/005 |
| 2022/0076236 A1 | 3/2022 | Bodalia et al. | |

OTHER PUBLICATIONS

U.S. Appl. No. 17/951,428, "Notice of Allowance", Apr. 16, 2025, 25 pages.

\* cited by examiner

DISTRIBUTED COMMUNICATION BETWEEN DEVICES

BACKGROUND

Smart devices are electronic devices that can offer a host of features to autonomously accomplish ordinary tasks that were previously performed manually with direct user involvement. Consumers are using more of these smart devices to improve efficiency, offer greater control over their environments, and improve user convenience. As more smart devices are being integrated into a single environment, new approaches for enabling these devices to autonomously perform tasks are desired.

DETAILED DESCRIPTION

Figure 1:
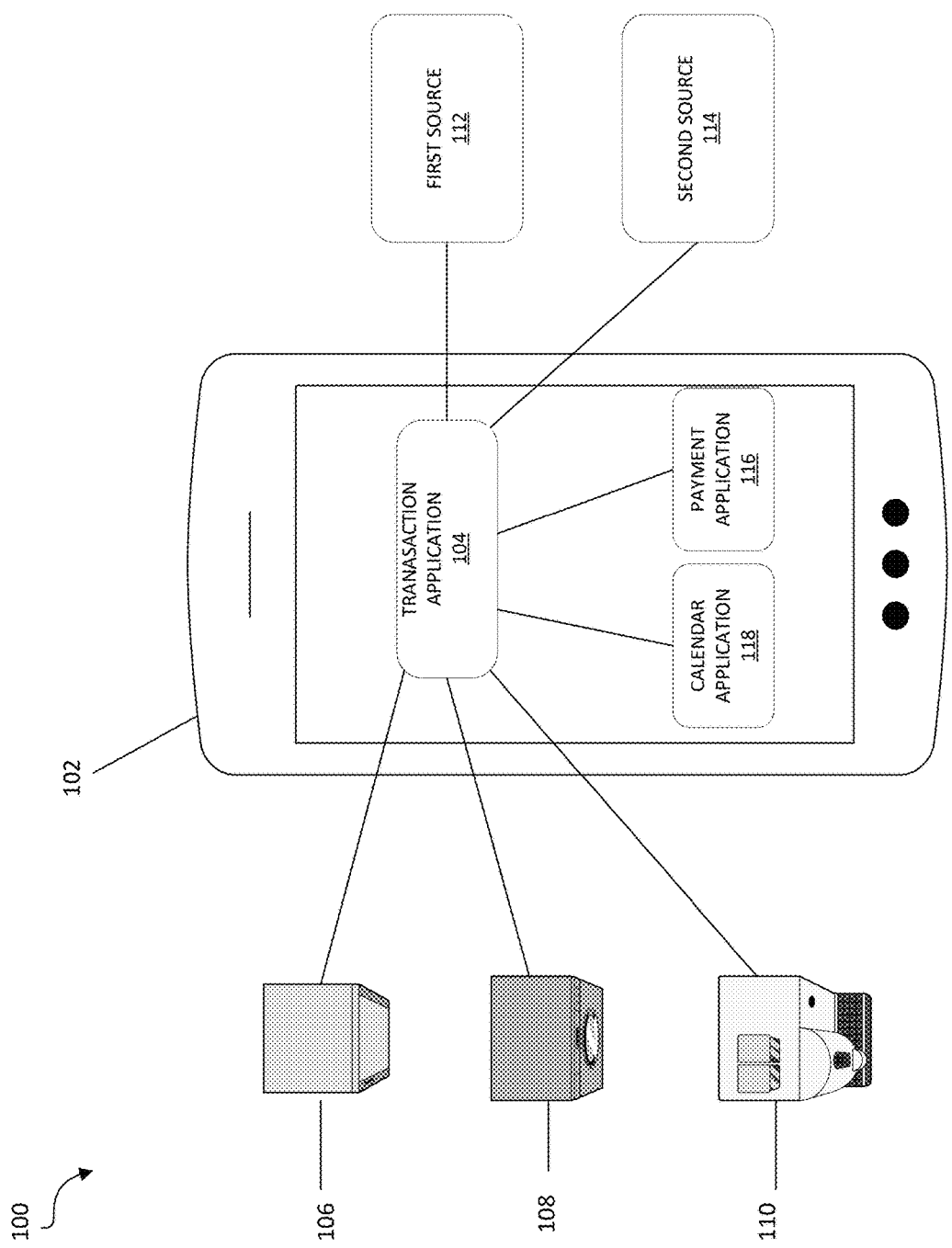
FIG. 1 is a diagram of a system for effectuating a transaction by an intermediary device, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A modern home or office environment can include a variety of household devices spread throughout the environment. As stand-alone devices, each of the devices can further be configured to perform a specific task needed in a household. For example, a refrigerator can keep food cold, and a thermostat can regulate the temperature. With the integration of wireless technology and inter-connectivity principles, these devices can be further configured to perform tasks that take the place of functions that people used to perform. However, with the expansion of the number of devices in a home and the number of capabilities each device possesses, users can become overwhelmed with managing the environment. Furthermore, each new device can require additional products for maintenance (e.g., ink, sensor calibration, air conditioning filters). Maintaining a smart device can be a time-consuming and cumbersome task. A smart device can be configured to provide visualizations of current demands to assist a user. However, this can add complexity to the software and require additional components, such as a display, to provide the visualizations. Therefore, a technical issue can be enabling electronic communication between a smart device and a user device without adding to the complexity of the smart device.

The issues associated with increased maintenance and use demands from smart devices are coupled with an increased number of item sources. The information age has enabled technologies that permit sources of information (and/or items) to directly provide item information in electronic format through a variety of transmission methods, such as electronic mail and messaging services. Such communications have become so ubiquitous that many mail services offer filtering tools that can route some communications to designated folders. However, even with these tools, unwanted communications can be presented to users through their devices.

Additionally, each source can include a computing system that is configured to communicate via respective schema, where a user device can be configured to communicate via a different schema. Compatibility issues between a source server and a user server can cause one or more functionalities of the source application or the user device to become disabled. This can either cause a delay in a transaction between a user and a source or render a transaction unrealizable. Therefore, another technical issue can be permitting sources to provide information in an electronic format to a user regardless of source/server configuration. In addition to the above-referenced issues, communications between user devices and sources raise privacy concerns as data is transmitted between the parties. Each time that a user device transmits data to a source server, the source server can store the data in a database. With each successive transaction, the source server can receive and store additional information regarding the user. It can be advantageous to anonymize aspects of an electronic communication to permit a user to maintain some level of privacy. Therefore, yet another technical issue is permitting transactions between users and sources while anonymizing electronic communications between these parties.

Embodiments described herein provide technical solutions to the above-referenced issues by providing a framework for an application that can communicate with a smart device in a local environment and determine a need for the environment. The application can further be configured with logic for effectuating a transaction to satisfy the smart device's need. The logic can take into consideration various user-defined parameters, such as a user's schedule, an available resource allotment, a user's priorities, and/or events (e.g., birthdays, holidays). The framework permits the application to receive information from a source (e.g., item information), and in response, the application requests a status of the smart device (e.g., printer is out of ink). If the production information matches the smart device's need based on the status, the application can parse the item information to determine whether the information is compliant with the user-defined parameters. If the item information is compliant with the user's specification parameters, the application can initiate a transaction with the source. If the item information is not compliant with the user's specification parameters, the application can decline to initiate a transaction with the source. The application can further act as an intermediary between the source and the smart device that guards any smart device identifying information (e.g., washing machine make, model, and number) from passing from the smart device to the source. In this sense, information related to which smart devices that a user may own are not transmitted to the source. Furthermore, users can be inundated with information by sources, such that users mentally shut out the information in its entirety. The herein-described processes can be performed by a background process. A background process is a software process that runs behind the scenes, and independent of user input. An example of a background process is a daemon for running a malware detection program, or a daemon for maintaining an internet connection. Therefore, a user is not visibly inundated with information from sources. Rather the information can be received and processed in the background without the user noticing the information (e.g., it may not be displayed via a user interface (UI)).

The framework can also permit the application to receive the status update from the smart device, which can include a smart device need. The need can be an affinity product, wherein an affinity product is a product associated with the smart device. For example, the affinity product can be a product that the smart device uses to perform a function or allows the smart device to perform a function. In some instances, the smart device can exert physical or operational control over the affinity product. For example, a smart printer can rely on ink to print documents, and the smart printer can hold the printer ink within a cartridge cover. In another example, an air conditioner can rely on a filter to filter on air passing through the air conditioning unit. The air conditioner can physically hold the filter on a rack. A refrigerator can keep food stored at a constant temperature. The refrigerator can store the food on a shelf inside the refrigerator. In another example, the affinity product permits the smart device to perform without interruption. For example, a computing device uses malware software to prevent malware from interfering with its operations. The computing device can store the software in memory. In response, the application can request that the source provide information. If the information is compliant with the user-defined criteria, the application can initiate a transaction with the source. If the item information is not compliant with the user's specification criteria, the application can decline to initiate a transaction with the source. As indicated above, the application acts as an intermediary between the source and the smart device, which guards any smart device identifying information from passing between the smart device and the source.

Consider an example, a homeowner has a mobile device, such as a phone, which is in communication with a smart device, such as a home printer, via a local network. While the homeowner is home, an application executing on the phone can receive information for printer ink, including an ink color, a cartridge size, an identification of a printer compatible with the cartridge, and a price. The application can communicate with the printer and request a status. The printer can respond with a status, including a black ink level and a red-blue-green ink color level. The application can determine whether the information and the status from the smart device match in terms of compatible printer and cartridge. The application can then apply the logic to determine whether the ink is compliant with the user-based criteria for cartridge size, price, and ink level for acquiring ink. If the application determines that the ink is compliant with the user-based criteria, the application can initialize another application executing on the phone and complete a transaction for the ink. If the application determines that the ink is not compliant with the user-based criteria, the application can decline to proceed further.

FIG. 1 is a diagram of a system 100 for effectuating a transaction by an intermediary, according to one or more embodiments. A computing device 102 (e.g., smartphone, laptop, tablet, etc.) can include one or more applications, including a transaction application 104. The transaction application 104 can be configured to effectuate a transaction with a source based on a need of a smart device. In some embodiments, the transaction application 104 can include a user interface that can enable a user to input transaction parameters and approve or reject a transaction. The transaction application further includes a background process (e.g., a daemon) that can receive the user inputs and effectuate a transaction with a source. The transaction application 104 can communicate with one or more smart devices in an environment, such as a home environment. As illustrated, the transaction application 104 can communicate with a first smart device 106 (e.g., smart refrigerator), and second smart device 108 (e.g., smart washing machine), and a third smart device 110 (e.g., smart coffee machine).

It should be appreciated that although the transaction application is illustrated as being operable to communicate with three smart devices, the transaction application can communicate with any number of smart devices and different smart device types. Each of the smart devices can include a transceiver for wired or wireless communication and connecting to a network, such as a local Wi-Fi network and communicating with the computing device 102.

The transaction application 104 can communicate with a smart device via an API. For example, the transaction application 104 make a status request to the smart device via the API. In turn, the smart device can provide a status to the transaction application 104 via the API. The API can be standardized to permit different smart devices to communicate with the transaction application 104. For example, the API can include standardized HTTP methods, standardized naming conventions, standardized responses, standardized HTTP status response codes, and standardized error reporting. These standards can be made available to the one or more smart device manufacturers. Therefore, a smart device wanting to transmit item information to the transaction application 104 can do so by conforming to the API.

The transaction application 104 can also communicate with one or more sources. In particular, the transaction application can communicate with one or more servers associated with the sources via an application programming interface (API). The API can be standardized such that multiple sources can communicate with the transaction application via the API. As illustrated, the transaction application can communicate with a first source 112 and a second source 114. The first source 112 can be an online source, including, for example, an online platform (e.g., Amazon), a big box department chain (e.g., Target), and a manufacturing company (e.g., Hewlett Packard, Inc.). The second source 114 can be a local source that may or may not be a member of a chain, such as a local office supply store or local grocery store. Each of the first source 112 and the second source 114 can communicate with the transaction application 104 via the API regardless of the size and sophistication of the source.

The transaction application 104 can communicate with a source via an API. The API can be different than the API used to communicate with the smart device, and further be standardized to permit different sources to communicate with the transaction application 104. For example, a source can transmit item information to the transaction application 104 via the API. The item information can be unsolicited information. In other words, the source can transmit the information to the transaction application without having any prior information of the smart device, such as a targeted transmission to the transaction application based on the smart device or the user of the user device 102. Additionally, the transaction application 104 can transact or decline to transact with the source via the API. These standards can be made available to the one or more sources. Therefore, a source wanting to transmit item information to the transaction application 104 can do so by conforming to the API.

The computing device 102 can further include a payment application 116, including a digital wallet or payment platform that permit on-line purchases via the application. The payment application can be, for example Apple Wallet®, Google Pay®, Venmo®, and PayPal®. The transaction application 104 can communicate with the payment application 116 to identify an amount and source of user funds and transmit the funds to a source. The computing device 102 can further include a calendar application 118 that receive inputs indicative of a data associated with a need. The calendar application 118 is not necessarily a dedicated calendar application. Rather the calendar application 118 is operable to receive inputs that can be associated with the dates on a calendar.

The transaction application 104 can effectuate a source-initiated transaction or smart device-initiated a transaction. For a source-initiated transaction, a first source 112 can transmit item information to the transaction application 104. The item information can include, for example, a description of the item, an item brand, a use of the item, a produce price. In some instances, the produce information can further include a promotional offer, such as a price discount or other promotional offer (e.g., buy one get one). In response to receiving the item information, the transaction application 104 can transmit a request to a first smart device 106 for a status update. The transmission can be targeted to specific smart devices, based on the item. For example, if the item is printer ink, the transaction application 104 can transmit the status update request to a printer, rather than say a device that does not require ink.

In some embodiments, the transaction application 104 can have previously asked the first smart device 106 or a status update and stored the update in the cache. Furthermore, the time elapsed between the previous status update and receipt of the production information can be small enough that there can be no significant change in the status. For example, if the printer ink level is at 80% within a previous ten minutes, it is unlikely to have fallen below the level enough to need to replenish the ink. Therefore, in these embodiments, the transaction application 104 can check the cache to determine whether to transmit a status update request. In particular, the transaction application 104 can calculate an elapsed time between receipt of the previous status update and receipt of the item information. If the elapsed time is less than a threshold time, the transaction application 104 can rely on the stored status update. If the elapsed time is greater than the threshold time, transaction application 104 can request a new status update.

The transaction application 104 can receive the status update from the first smart device 106. The status update can include an indication of whether the first smart device 106 is in need of the item described by the item information. The smart device's need can be based on a user-defined parameter. A user can access the transaction application 104 via a user interface. The user can further input one or more parameters for initiating a transaction into the application. A parameter can establish a triggering condition for the transaction application 104 to initiate a transaction with the source. For example, if the smart device is printer can provide a status update that provides an ink level (e.g., 68%). The user can have established a threshold ink level, which can be stored on the computing device 102 and accessed by the transaction application 104. The transaction application 104 can compare the reported ink level with the threshold ink level and determine whether to initiate the transaction. For example, if the ink level is below the threshold level, the transaction application can initiate a transaction with the first source 112. If, however, the ink level is above the threshold level, the transaction application can decline to initiate a transaction with the first source 112.

In addition to a parameter based on a state of the smart device (e.g., ink level, air conditioner filter age, washing detergent quantity) the transaction application 104 can consider one or more user-defined parameters that designate one or more conditions for initiating a transaction with the first source 112. In effect, the parameters can establish the conditions upon which the user wishes to make a transaction and the decline to make a transaction with a source. The conditions can be based on factors outside of the state of the smart device. For example, the conditions can include a maximum price, a date range, available funds, a brand, and an expected delivery date. In some instances, the parameters can be retrieved from the calendar application 118. The transaction application 104 can detect calendar entries and determine whether to initiate a transaction based on the entries. In some further instances, the transaction application 104 can further determine whether to initiate a transaction based on a calendar entry in view of a user-defined parameter. For example, the calendar application can include a date range for a user vacation which overlaps with an expected delivery date. In this instance, the user may have further set a parameter that no transactions for deliveries while the user is not available. The transaction application 104 can further determine whether to initiate a transaction with the first source 112 based on a comparison of the item information with the parameters.

The transaction application 104 can elect to initiate a transaction with the first source 112 based on compliance with the user-defined parameters. The transaction application 104 can initialize the payment application 116 and provide user information and payment information to the first source 112. For example, the first source 112 can provide a data structure (e.g., a table) with fields required to complete a transaction to the transaction application 104. The transaction application 104 in conjunction with the payment application 116 can populate the fields to effectuate the transaction. In this sense, the first smart device 106 and the first source 112 do not communicate directly with each other. Therefore, the first source 112 does not retrieve smart device information (e.g., brand, make, and model) from the first smart device 106. This further protects the privacy of the first smart device 106 and by extension, the first smart device owner.

For a smart device-initiated transaction, a first smart device 106 can transmit a status to the transaction application 104. The first smart device's status can include a request for an item that the first smart device 106 is associated with and needs to replenish. For example, the first smart device 106 can be a refrigerator equipped with a sensor (e.g., image, pressure, temperature). Based on the sensor, the smart refrigerator can determine that it needs to replenish an item (e.g., coolant, eggs, water filter). The smart refrigerator can transmit a status to the transaction application 104 that the item needs to be replenished.

The transaction application 104 can search received item information to determine whether it has received an item information related to the item that needs to be replenished. From time to time, the transaction application 104 can receive item information instances from one or more sources. The transaction application 104 can further store the received item information instances in local memory, such as cache. The transaction application 104 can search the stored item information instances for an item that matches the item requested by the first smart device 106. The transaction application 104 can further transmit a request for item information to another source, such as the second source 114. The transaction application 104 can transmit the request for the item information from the second source 114 regardless of whether any of the stored item information instances include an item matching the request from the first smart device 106.

The transaction application 104 can further determine which source to initiate a transaction from based on the item information instances. If only one item information instance matches the requested item, then the transaction application 104 can determine whether to initiate a transaction with a source based on the user-defined parameters. If, however, the transaction application 104 has detected more than one item information that matches the requested item, the transaction application 104 can compare different item information instances to determine which item to select. Initially, the transaction application 104 can determine whether each of the item information instances are compliant with the user-defined criteria. For example, the transaction application 104 can include rule-based logic or use a machine learning algorithm that can compare items and determine which item to select. The transaction application 104 can remove items that are not compliant with the user-defined criteria as candidates for selection. The transaction application 104 can then compare the remaining candidate items to determine which item to select. Each of the rules and the machine learning algorithm can further include weights for each parameter that emphasize the importance of each parameter to the user. The weights can be user-defined and weigh one parameter greater than, the same, or less than another parameter. For example, if one parameter is price and another parameter is delivery time, the weights can weight price weights greater than, the same, or less than delivery time. The transaction application 104 can score each item based on the weights and determine which item to select. Based on the selection, the transaction application can initialize the payment application 116 and complete a transaction for the selected item.

Similar to the source-initiated transaction, the first smart device 106 and the first source 112 do not communicate directly, and rather use the transaction application 104 as an intermediary. In this sense, information related to which smart devices that a user may own are not transmitted to the source. As an extension, the user's information is not transmitted to the source.

Figure 2:
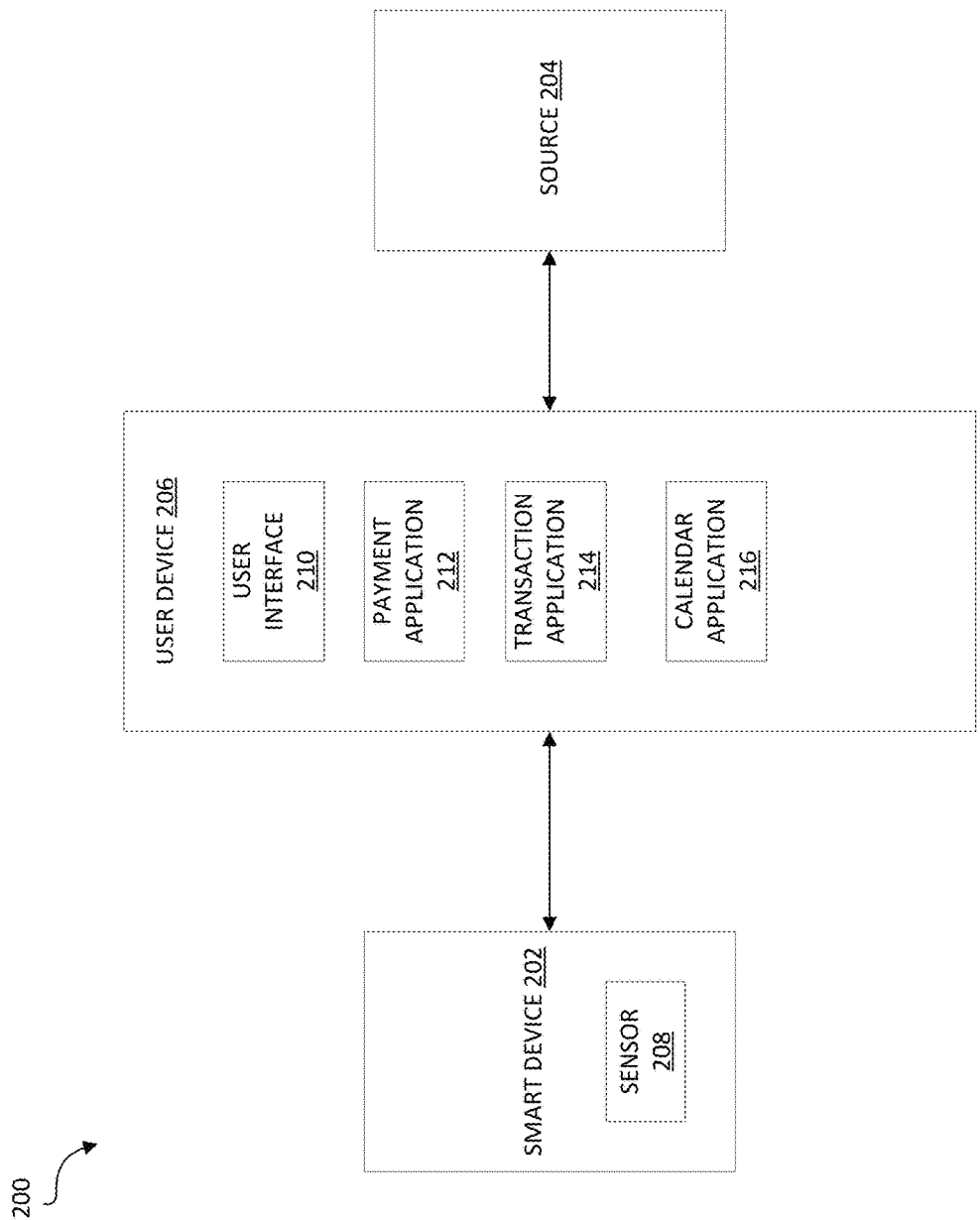
FIG. 2 is a diagram of a network architecture for effectuating a transaction by an intermediary, according to one or more embodiments.

FIG. 2 is a block diagram of a network architecture 200 for effectuating a transaction by an intermediary, according to one or more embodiments. As illustrated, a smart device 202 can be in operable communication with a source 204 via a user device 206. The smart device can be a computing device in a home or office environment that can be connected to a network via a wireless connection or a wired connection. The smart device 202 can further include a sensor 208 that can collect data related to the quantity and/or quality of one reduceable of the smart device 202, where reduceable refers to quality or quantity. For example, the smart device 202 can be a printer, and the sensor 208 can collect data related to the amount of ink in an ink cartridge. In another instance, the smart device 202 can be a refrigerator water dispenser and the sensor 208 can collect data related to the quality of a water filter. It should be appreciated that although a single smart device and source are in communication with the user device 206. The user device 206 can be in communication with multiple smart devices and multiple sources.

The smart device 202 can collect data retrieve from the sensor 208 and store the data. For example, the smart device 202 store the collected data in cache. The smart device 202 can communicate with the user device 206. For example, the smart device 202 and the user device 206 can communicate via an application programming interface (API). The smart device 202 and the user device exchange information related to the reduceable item of the smart device 202 and one or more items and services to replenish the reduceable item, where replenish can refer to replenishing a quantity of the reduceable item or a quality of the reduceable item. For example, if the smart device 202 is a printer, the printer and the user device 206 can exchange information related to replenishing the ink. If the smart device 202 is a water dispenser, the water dispenser and the user device can relate to exchanging information to receive a new filter to improve the quality of the water. In even another example, the smart device is a home computer and the reduceable item is a software subscription, such as a malware detection service. The smart device 202 and the user device 206 can exchange information regarding managing an account status.

The communication between the smart device 202 and the user device 206 can be initiated by the smart device 202 or the user device 206. In some instances, the smart device 202 can receive a message from the user device 206 requesting a status (e.g., quantity or quality of reduceable item) of reduceable item. The smart device 202 can, in response to the message, retrieve a status of the item. For example, the status can be stored in the cache of the smart device 202. The smart device 202 can retrieve the status from cache and transmit a response to the user device. The response can include, for example, a device identifier, an account identifier, and a status of the reduceable item.

In other instances, the smart device 202 can initiate the communication. The smart device can, from time to retrieve the smart device status. For example, the smart device 202 can retrieve the status from the smart device's cache. The smart device 202 can then process the status to determine a next step. For example, the smart device can process the status using a set of rules-based logic, to determine a next step. For example, the rules can include a threshold quantity (e.g., desired water filter lifespan) that can be compared to a quantity indicated by the status. In other instances, the rules can include a threshold quality (e.g., water quality). In yet other instances, the rules can include a desired state (e.g., renewed water dispenser warranty or no renewed water dispenser warranty).

The smart device 202 can further analyze the status to determine whether the status indicates that the reduceable item is about to be reduced beyond an acceptable level. For example, based on a comparison between the status quantity and a threshold quantity, the smart device 202 can transmit a message to the user device 206. The message can include a request to replenish a reduceable item, for example, a request for additional reduceable item (e.g., more printer ink, warranty extension).

The source 204 can include a computing system, for example, a server made of two or more connected devices. The source 204 can communicate with the user device via a wire (a wire connected router) wirelessly (e.g., via wireless router). The source 204 can include information engine for transmitting information to the user device 206 or receiving requests for information from the user device 206. The source 204 can further include a transaction engine for effectuating transaction with the user device 206.

The source 204 can communicate with the user device 206. For example, the source 204 and communicate with the user device 206 via an API. In some embodiments, the source 204 can initiate a communication with the user device 206. In other embodiments, the user device can initiate a communication with the source 204. For example, the source 204 can transmit information to user device 206 regarding an item a service. The service can be in electronic format and provide item information including description, price, availability, and delivery information. The information can be pushed to the user device 206, such that user device 206 receives the information without requesting the information. In some embodiments, the information can further be transmitted without the source 204 having smart device information stored on the source's database. For example, the source may transmit information related to an item or service, without the knowing whether the user device 206 is connected to a smart device that needs the item or service. In this sense, the user device 206 can act as a clearinghouse for initiating contact with the smart device 202 based on matching the information provided by the source 204 with the smart device 202. In other embodiments, the source can store information including past messages received from the user device 206 and associated item types. For example, the source can store information that the user device 206 has previously purchased additional cloud server storage. Therefore, the source 204 can use this information to provide information regarding cloud server storage.

The source 204 can further receive a message from the user device 206. The received messages can be based on whether the source initiated the communication with the user device. For example, if the source 204 initiated the communication with the user device 206, the source 204 can receive a message requesting a transaction for the item or service associated with the information transmitted to the user device 206. The message can be received and routed to a transaction engine that can determine whether to execute the transaction or reject the transaction. If, however, the user device 206 initiated the transaction, the message can be a request for information from the source 204. In response to the request for information, the source 204 can provide the information to the user device 206. The information can include information associated with an item or service. The information can be similar to the information provided by the source 204 to the user device 206 had the source 204 initiated the communication. The source 204 can be further configured to receive information from the user device 206. For example, the source 204 can receive a message from the user device 206 that includes a request for a transaction with the source 204. The source 204 can route the request to a transaction engine that can determine whether or not to proceed with the transaction.

The user device 206 can be a computing device operable to communicate with the smart device 202 and the source 204. The user device 206 can be, for example, a smart phone, a tablet, a personal computer, or other appropriate computing device. The user device 206 can include a user interface (UI) 210, a payment application 212, a transaction application 214, and a calendar application 216. Each of the applications can include background processes that support the user facing applications. A user can use the UI 210 to interact with a user facing application and cause to a background process to perform one or more functions. The UI 210 can enable the user to enter manual inputs that cause a background process to, for example, add data, modify data, or remove data. For example, the user can access a payment application (e.g., Apple Wallet) to enter financial data, such as credit card information or bank account information. The payment application 212 can store the information and upon request from another application (e.g., the transaction application) can provide the information to effectuate a transaction.

The user device 206 can further include a transaction application 214. The transaction application can be an application that can facilitate communication between the smart device 202 and the source 204. The transaction application 214 can transmit to and receive messages from the smart device 202. The transaction application 214 can further transmit to and receive messages from the source 204. The transaction application 214 further can further communicate with the smart device 202 and the source 204 such that neither the smart device 202 nor the source 204 receive identifying information regarding the other. For example, the transaction application 214 can receive a communication from the smart device 202 to replenish a reduceable item. In response, the transaction application 214 can initiate a transaction with the source 204 without identifying the smart device 202. Additionally, the source 204 can transmit information regarding a reduceable item (e.g., washing detergent). In response, the transaction application can request a status from the smart device 202 (e.g., amount of washing detergent left) without identifying the source.

The smart device 202 can communicate with the transaction application 214 via an application programming interface (API). The API can be a standardized API, such that each smart device that communicates with the transaction application 214 using the same API. The API can be considered a communication layer with standardized rules and conventions. The standardization can include various aspects of the API, such as hypertext transfer protocol (HTTP) methods, variable names, HTTP response status codes, and error reporting. Each of these elements has associated behaviors, and through standardization, smart device software manufacturers can expect the user device's API to behave in a particular fashion. Standardizing the API further simplifies the transaction application logic and enables easier interfacing with multiple smart devices.

The transaction application 214 can operate in multiple modes. For example, the transaction application 214 can operate in an automatic mode, in which the transaction application can be configured to determine whether to transact for a reduceable item and initiate a transaction with a source. The transaction application 214 can further operate in a manual mode, in which prior to effectuating a transaction with a source, the transaction application 214 can provide a user with the opportunity grant final approval for effectuating the transaction. The transaction application 214 can further operate in a mixed mode, in which the user can configure the transaction application 214 with criteria (e.g., pricing constraints, calendaring constraints) to follow to effectuate a transaction. In the mixed mode, if a transaction violates one or more criteria, the transaction application 214 can present the transaction and violated criteria to the user for final approval to effectuate the transaction.

The transaction application 214 can be triggered to determine whether to initiate a transaction with the source 204 based on various inputs. The inputs can include receiving an information from the source 204 or receiving a request from the smart device 202. How the transaction application responds to the input can be based on the operating mode. For example, in an automatic mode, the transaction application 214 can receive a request from the smart device 202 and effectuate (e.g., request information and initiate a transaction) a transaction with the source 204 using the payment application 212. Alternatively, the transaction application 214 can receive information from the source 204 and make a status request to the smart device 202. If the smart device 202 indicates that a reduceable item is needed, the transaction application 214 can, in conjunction with the payment application 212, effectuate the transaction.

In a manual mode, the transaction application 214 can receive a request from the smart device 202 and request an offer from the source 204. The transaction application 214 can then present the offer to the user via the UI 210. Based on the response from the user, the transaction application 214 can effectuate a transaction with the source 204 using the payment application 212. Alternatively, the transaction application 214 can receive information from the source 204 and make a status request to the smart device 202. If the smart device 202 indicates that a reduceable item is needed, the transaction application 214 can present the offer to the user via the UI 210. Based on the response from the user, the transaction application 214 can effectuate a transaction with the source 204 using the payment application 212.

In a mixed mode, the transaction application 214 can receive a request from the smart device 202 and request an offer from the source 204. The transaction application 214 can refer to the user-based criteria to determine whether to continue with the process. For example, the transaction application 214 can be configured with logic that encodes the user-based criteria into the transaction application 214. Based on whether the information (e.g., price, item information, delivery time) conforms to the criteria, the transaction application 214 can then present the offer to the user via the UI 210. Based on the response from the user, the transaction application 214 can effectuate a transaction with the source 204 using the payment application 212. Alternatively, the transaction application 214 can receive information from the source 204 and make a status request to the smart device 202. If the smart device 202 indicates that a reduceable item is needed, the transaction application 214 can refer to the user-based criteria to determine whether to continue with the process. If the information is compliant with the criteria and the smart device 202 indicates a need, the transaction application 214 can present the offer to the user via the UI 210. Based on the response from the user, the transaction application 214 can effectuate a transaction with the source 204 using the payment application 212.

In some embodiments, the transaction application operating mode can be smart device specific. For example, the transaction application 214 can manage a first smart device and a second smart device. The transaction application 214 can manage the first smart device using a first operating mode (e.g., automatic, manual, or mixed) and manage the second smart device using a second operating mode (e.g., automatic, manual, or mixed). The user can use the UI 210 to select modify or revoke an operating mode for one or more smart devices.

The transaction application 214 can further protect the information of the user, by protecting the information of the smart device 202. The transaction application 214 can communicate with the smart device 202 separately from any communication with the source 204. In other words, the transaction application does not simply pass messages between the smart device 202 and the source 204. Rather the transaction application 214 can create messages to transmit to one of the smart devices 202 or the source 204 based on a received message from the other. For example, in response to receiving an information from the source, the transaction application 214 can create a first message including a status request to the smart device 202. In response to receiving the status, the transaction application can create a second message to initiate a transaction with the source 204. The status response from the smart device 202 can include a device identifier for the smart device. However, the transaction application 214 can keep the device identifier (and any other identifier) from being included in the second message. Therefore, the source 204 can be unaware as to which smart device to associate the second message.

In some embodiments, in addition to transmitting messages to the source 204 without any identifier information, the transaction application can further vary the sources. The transaction application 214 can include a database that stores information that associates a smart device, a request, and each source contacted to replenish a reduceable item for the smart device. The transaction application. In some instances, the source 204 is a manufacturer associated with the reduceable item. In which case, the transaction application 214 can select a different manufacturer. In other instances, the source 204 is an online platform that hosts multiple manufacturers. In these instances, the transaction application can select another platform or another manufacturer within the platform. In this sense, by implementing a distributed purchasing, the source cannot accumulate user device related information to indirectly determine information about the smart device and consequently the user.

As indicated above, the transaction application 214 can be configured with logic to determine whether to initiate a transaction with a source 204. Therefore, in some embodiments, the user device can further include a calendar application 216. The transaction application 214 can use the calendar application to determine when to initiate a transaction. For example, the user can use the UI to manually input a timing criterion for one or more reduceable item. For example, the user can input a criterion to purchase an item (e.g., milk) at the beginning of each month. The transaction application 214 can monitor the calendar application to detect the timing criteria (e.g., the beginning of each month). In the event that the transaction application 214 determines that timing criteria has been reached (e.g., the current date is the beginning of the month), the transaction application 214 can send a request to initiate a transaction with the source for a reduceable item) In this sense, the transaction is not initiated by the smart device 202 (e.g., refrigerator), rather by user-based logic to replenish a reduceable item associated with the smart device 202.

In other embodiments, the user can use the calendar application 216 to initiate a transaction. The user can manually enter one or more inputs associated with one or more dates to initiate a transaction. The manual inputs can be written in plain text into one or more dates of the calendar. For example, the user can select a future date and type in buy one pound of Peet's coffee. The transaction application 214 can read the entries in the calendar application 216. The transaction application 214 can further take one or more actions (e.g., initiate a transaction) based on the one or more calendar entries. For example, the transaction application 214 can detect the entry and determine the context of the entry. For example, the transaction application 214 can use natural language processing (NLP) techniques, to determine that the user wants to buy one pound of Peet's coffee on a particular date. Based on the determination of the context, the transaction application 214 can contact a source 204 (e.g., Peets coffee or an online retailer selling Peet's coffee). The transaction application 214 can then initiate a transaction (e.g., buy one pound of Peet's coffee) with the source 204 based on the calendar entry.

The transaction application 214 can communicate with the source 204 via an API, which is distinct from the API used by the smart device 202 to communicate with the transaction application 214. The API can be a standardized API, such that the transaction application communicates with multiple sources using the same API. The API can be considered a communication layer with standardized rules and conventions. Standardizing the API further simplifies the transaction application logic and enables easier interfacing with multiple sources.

Figure 3:
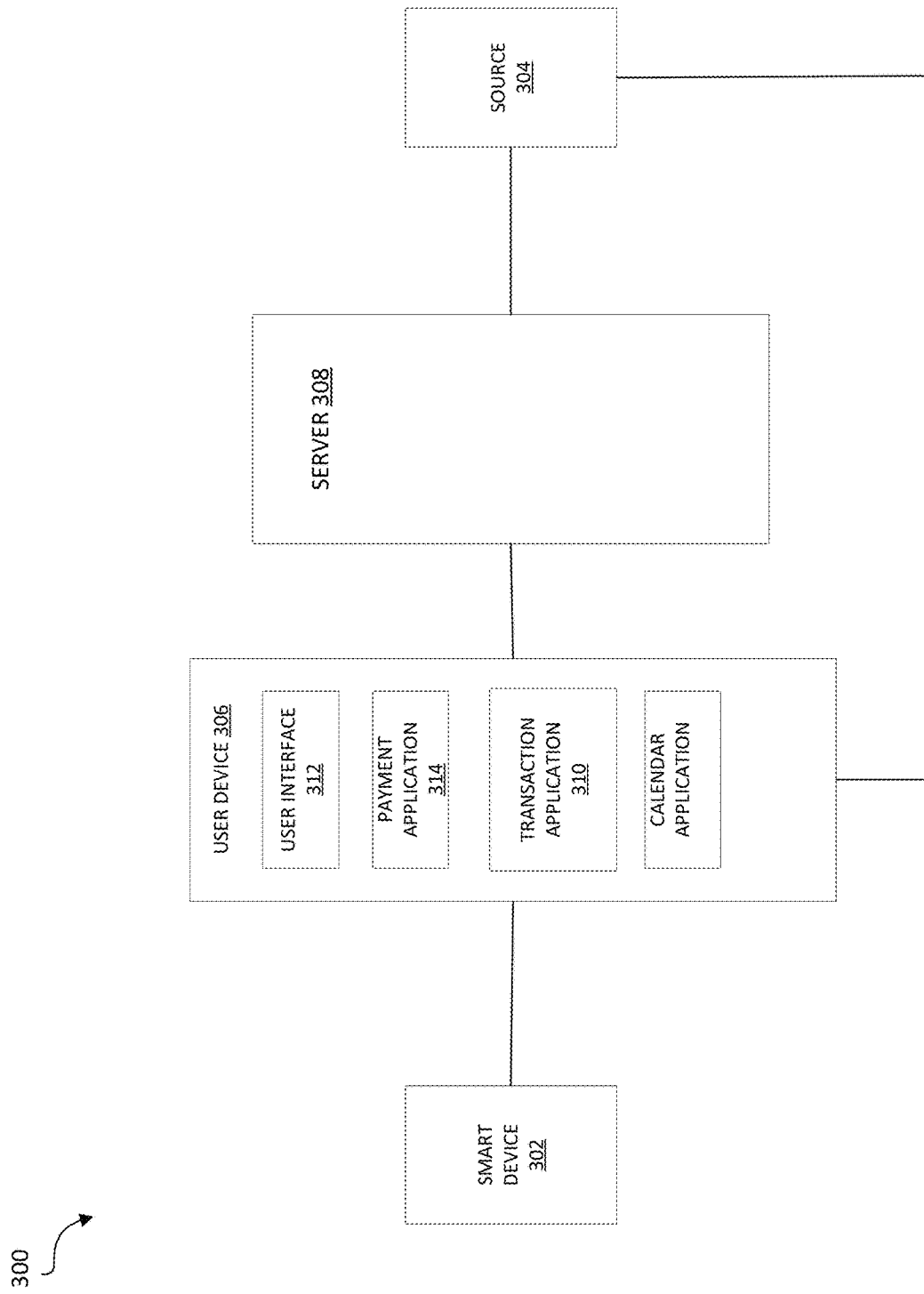
FIG. 3 is a diagram of a network architecture for effectuating a transaction by an intermediary, according to one or more embodiments.

FIG. 3 is a block diagram of a network architecture 300 for effectuating a transaction by an intermediary, according to one or more embodiments. In some embodiments, the privacy of the user can be further enhanced by using a server as an intermediary between the transaction application and the source. As illustrated, a smart device 302 and be in communication with a source 304 via a user device 306 and a server 308.

The server 308 can include one or more computing devices configured to provide support for a transaction application 310. For example, the transaction application 310 can be published by Apple and the server 308 can be an Apple server or used by Apple to support the transaction application 310. While the user device 306 can be associated with a same environment as the smart device 302, the server 308 can be located remotely from the smart device 302 and the user device 306. For example, the smart device 302 can be a device in a home or office environment, and the user device 306 can be a smartphone, tablet, or other device of an occupant of the home or office. On the other hand, the server 308 can be one or more computing devices that are located away from the home or office environment. For example, the server 308 can be located at one or more data centers located throughout the globe.

The inclusion of the server 308 as an intermediary between the user device 306 and the source 304 can be selected by the user. For example, the user can use a UI 312 to access the transaction application 310. The user can further make a selection to route transmissions to and from the source 304 to the server. In the event that the user selects to include the server 308, the transaction application 310 can transmit communications to the server 308, rather than to the source 304 as illustrated in FIG. 2. Furthermore, the source 304 can transmit communications to the server 308 rather than to the user device 306 as illustrated in FIG. 2.

The inclusion of the server 308 reduces the number of information instances received by the user device 306. As described above, transactions between the user device 306 and a source 304 are designed to reduce the amount of information a source receives regarding the user's smart devices. Therefore, one or more sources can be deprived of certain information elements that can be used for targeted information instances to the user. Therefore, in response one or more sources can increase the number of information instances transmitted to the user device 306. Therefore, the server 308 can be introduced to receive the information instances, the reduce the user device memory needed for the increased number of information instances.

As described above, the server 308 can be associated with the publisher of the transactional application and be configured to support the transaction application 310. Therefore, user criteria that are either manually inputted by the user into the transaction application or derived from inputs or transactions can be stored in the server 308. The server 308 can use the user criteria to filter the information instances. For example, the criteria can include price, availability ceiling, brand, quantity, and other appropriate criteria. The server 308 can analyze each information instance in view of the user-defined criteria. For example, the server 308 can use NLP techniques to determine whether or not an information instance is complaint with the user criteria. The server 308 can transmit information instances to the transaction application 310. For example, the server 308 can transmit information instances that are compliant with the user criteria.

In some embodiments, the server 308 can further filter the information instances to rank the instances. The server can be configured with logic that defines rules for selecting one information instance over another information instance. The ranking can be based on various factors such as price, availability ceiling, brand, quantity, and other appropriate criteria. In embodiments, in which the server 308 performs a ranking, the server 308 can transmit the information instances based on the ranking. For example, the server 308 can transmit the top-N information instances based on the ranking. In other instances, the server 308 can transmit each information instance with a corresponding ranking.

Even though the server 308 acts as an intermediary between the transaction application 310 and the source 304, the transaction application 310 can still be operable to perform some or all of the functionality as described with respect to FIGS. 1 and 2. For example, the transaction application 310 can receive, via the standardized API, a request for a reduceable item from the smart device 302. The transaction application 310 can receive one or more information instances via the server 308 from the source 304. The transaction application 310 can transmit a status request to the smart device 302, and further receive a response from the smart device 302. The transaction application 310 can analyze an information instance in view of user criteria to determine whether to initiate a transaction with the source. The transaction application 310 can initiate and effectuate the transaction via the server 308 acting an intermediary passing messages between the transaction application 310 and the source 304.

As indicated above, the server 308 can act as an intermediary between the transaction application 310. This arrangement can further enhance the privacy of the user by creating messages that do include identifying information of the user, user device 306 or smart device 302. In an instance, that transaction application 310 communicates directly with source 304, the communication can include the source 304 detecting a user device identifier, a network that the user device is connected to, or other information that the source 304 could use to identify the user of smart device 302. Therefore, rather the server 308 can create messages to transmit to the source 304 based on a message received from the transaction application 310. For example, in response to receiving a request for an information instance from the transaction application, the server 308 can create a first message including the request for information to the source 304. The server 308 can remove identifying from the message that could be used to identify the user, user device 306 or smart device 302. Additionally, in response to a message to initiate or effectuate a transaction, from the transaction application 310, the server can remove identifying from the message that could be used to identify the user, user device 306 or smart device 302. Therefore, the source 304 can present information instances, and effectuate transactions without a knowledge of the user, user device 306 or smart device 302.

Each user, user device, and transaction application instance can be associated with an identifier used by the server 308. In the event that the server creates a message, the server 308 can apply the identifier and transmit the message to the source 304. The source 304 can use the identifier to identify a transaction instance. The source 304 can send a response using the identifier to allow the server 308 to determine which transmission is the response associated with. The server 308 can further generate new identifiers for the user, user device, and transaction application instance, such that the source cannot identify the user, user device, and transaction application instance based on a repeated use of the identifier.

The server 308 can communicate with the source 304 via an API, which is distinct from the API used by the smart device 302 to communicate with the transaction application 310. The API can be a standardized API, such that the transaction application communicates with multiple sources using the same API. Standardizing the API further simplifies the transaction application logic and enables easier interfacing with multiple sources. Therefore, the transaction application can communicate with the server 308 without a standardized API. As both the server 308 and the transaction application 310 can be associated with the same entity, the server 308 and the transaction application 310 can communicate via a proprietary API that is created by the entity.

Figure 4:
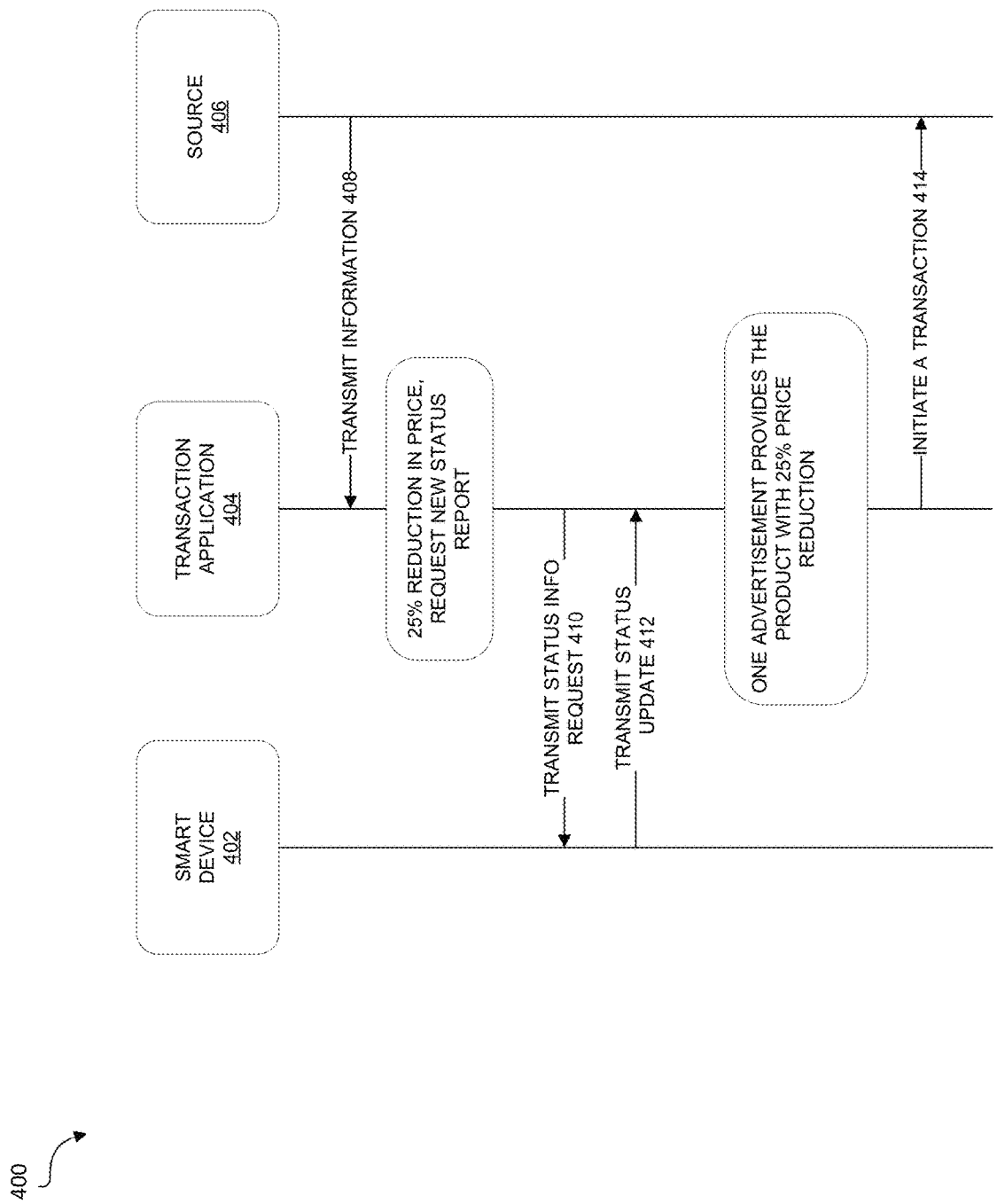
FIG. 4 is a signaling diagram for effectuating a transaction by an intermediary, according to one or more embodiments.

FIG. 4 is a signaling diagram 400 for effectuating a transaction by an intermediary, according to one or more embodiments. FIG. 4 relates to a source-initiated transaction. As illustrated, a smart device 402 can be in communication with a transaction application 404, and a source 406. While the operations of processes 400, 500, and 900 are described as being performed by generic computers, it should be understood that any suitable device (e.g., a reader device, a responder device) may be used to perform one or more operations of these processes. Processes 400, 500, and 900 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 408, the source 406 can transmit information to the transaction application 404. The source 406 can include one or more computing devices associated with a provider of items or services. The information can include one more characteristic of an item or service (e.g., price, description, availability). The transaction application 404 can be executed by a user device, such as a smartphone, personal computer, or tablet. The user device can be associated with a home or office environment which includes the smart device 402. The smart device 402 can be any device that is operable to collect data related to one or more reduceable item and present the data to the transaction application. As illustrated, the information includes a notice that an item or service is being offered at a twenty-five percent reduction in price. In some instances, the source 406 can include multiple sources that can each transmit a respective information instance to the transaction application 404.

At 410, the transaction application can transmit a request for status information to the smart device 402. The transaction application 404 can receive the information from step 408 and analyze the information to determine whether it is relevant to any smart device in the environment. For example, the transaction application 404 can extract key words and phrases from the information. The transaction application 404 can further determine whether any of the keywords in the information are associated with keywords or phrases associated with a smart device. If a threshold number or percentage of keywords or phrases associated with a smart device are a match, the transaction application 404 can determine that the information can be relevant to the smart device. In response to the determination, the transaction application 404 can transmit the request for status to the smart device 402.

At 412, the smart device 402 can transmit a status update to the transaction application 404. The smart device can, from time to time, monitor a status of a reduceable item. The smart device 402 can further store the status in the cache. In response to receiving the status request, the smart device 402 can retrieve the status of the reduceable item from cache and transmit the status to the transaction application 404. The status can include a quantity and/or quality of a reduceable item. For example, the reduceable item can be a filter, and the status can be the age of the filter, where the age is a measure of the presumed quality of the filter.

At 414, the transaction application 404 can initiate a transaction with the source 406. Based on the status of the update of the smart device 402, the transaction application can analyze one or more information instances based on the user-based criteria. The transaction application 404 can further eliminate candidate information instances based on whether the instances are compliant with the user criteria. For example, if the user has placed a price ceiling for an item, the transaction application 404 can remove any information instances associated with an item having a price greater than the price ceiling. The transaction application 404 can further rank the remaining candidate information instances. For example, the information instances can relate to washing powder, where one information instance offers includes a 25% price reduction. The transaction application 404 can select the information instance with the 35% price reduction and initiate a transaction with the source 406 of the information instance. In some embodiments, the transaction application can require approval from the user to initiate the transaction. The transaction application 404 can further use a payment application (e.g., Apple Wallet) to effectuate the transaction.

Figure 5:
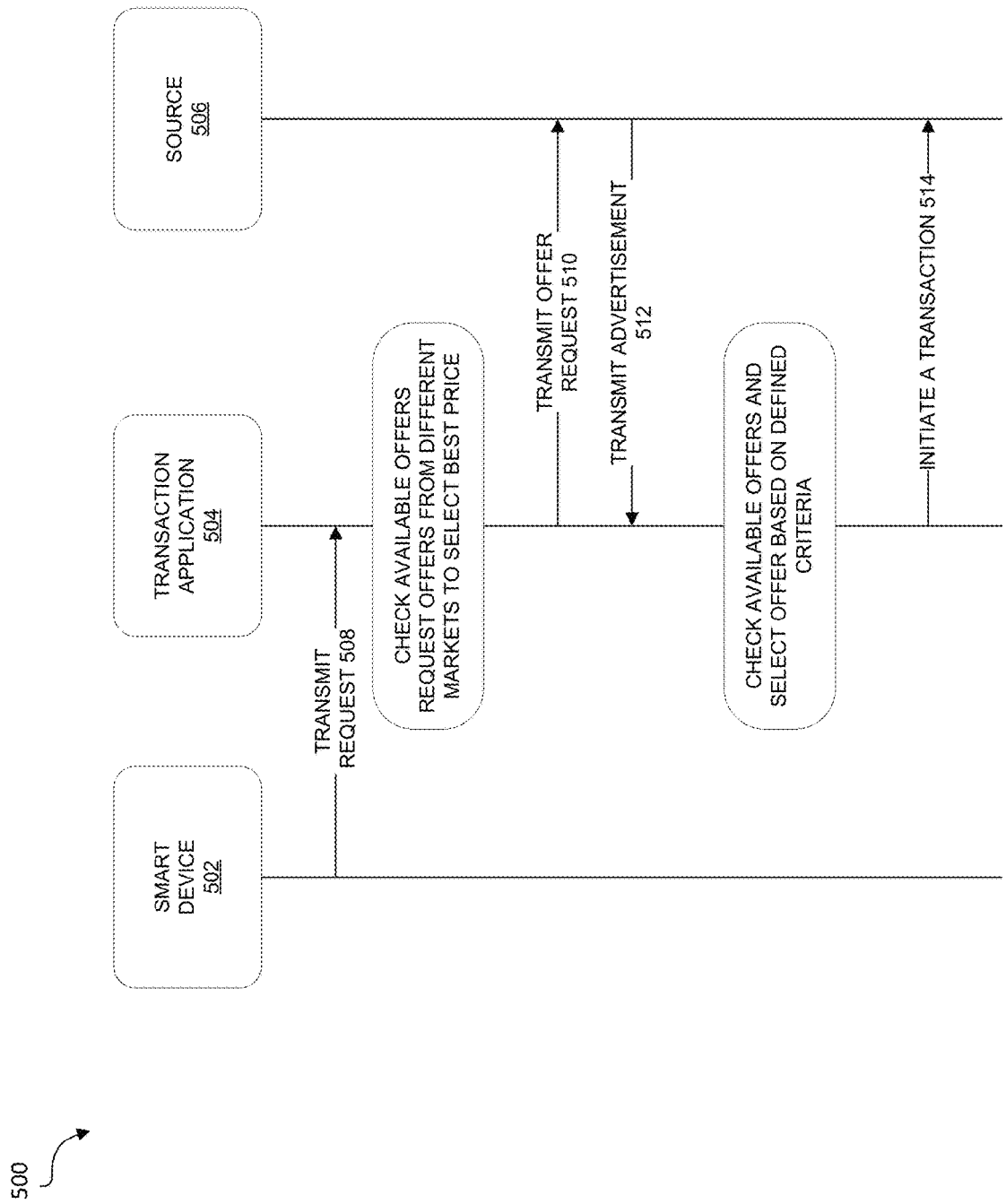
FIG. 5 is a signaling diagram for effectuating a transaction by an intermediary, according to one or more embodiments.

FIG. 5 is a signaling diagram 500 for effectuating a transaction by an intermediary, according to one or more embodiments. FIG. 4 relates to a smart device-initiated transaction. As illustrated, a smart device 502 can be in communication with a transaction application 504, and a source 506.

At 508, the smart device 502 can transmit a request to transaction application to replenish a reduceable item. For example, from time to time, the smart device 502 can monitor the quantity and quality of a reduceable item. The smart device 502 can further store the status of quantity and/or quality of the reduceable item in the cache. The smart device 502 can compare the quantity and/or quality of the reduceable item with a threshold quantity or quality. If the quantity or quality is below the threshold quantity and/or quality, the smart device can transmit the request at step 508.

At 510, the transaction application 504, the transmit a message to the source 506 to request information. The transaction application can store one or more information instances. The transaction application can further determine whether any of the information instances relate to items or services that can replenish the reduceable item. The information instances can be stored for a threshold period of time, at the expiration of which, the information instances are removed. In addition to detecting stored information instances the transaction application can transmit requests to one or more sources.

At 512, the source 506 can transmit an information to the transaction application 504. The information can be a different information instance than the information instances stored in by the transaction application.

At 514, the transaction application 504 can initiate a transaction with the source 506. The transaction application 504 can analyze one or more information instances based on the user-based criteria, including the stored instances and any new instances received at step 512. The transaction application 504 can further eliminate candidate information instances based on whether the instances are compliant with the user criteria. The transaction application 404 can further rank the remaining candidate information instances. In some embodiments, the transaction application can require approval from the user to initiate the transaction. The transaction application 504 can further use a payment application (e.g., Apple Wallet) to effectuate the transaction.

Figure 6:
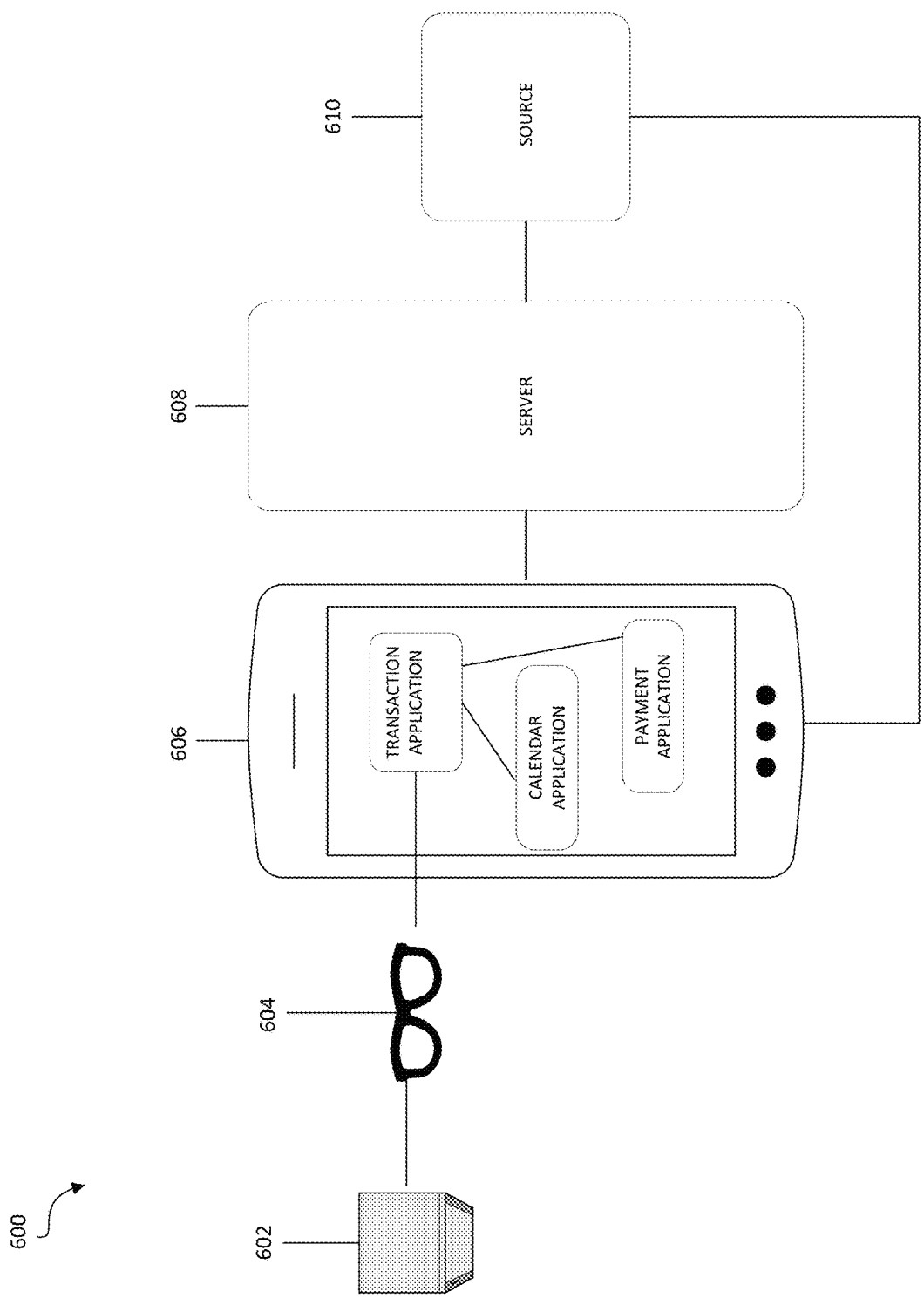
FIG. 6 is a diagram of a network architecture for effectuating a transaction by an intermediary, according to one or more embodiments.

FIG. 6 is a diagram of a network architecture for effectuating a transaction by an intermediary, according to one or more embodiments. As illustrated, a device 602 can be in communication with a sensor-based device 604, a user device 606, a server 608, and a source 610. It should be appreciated that although a server is illustrated, the interaction and functionality between the smart device 602, the sensor-based device 604, and the user device 606 can be the same.

The sensor-based device can be used in instances that a device is not a smart device. The sensor-based device can be a wearable device. For example, the sensor-based device 604 can include an image-capturing device, temperature-sensing device, an audio sensing device, or other sensing device. For instance, the device 602 can be a refrigerator and the sensor-based device 604 can be an image capturing device, such as a pair of glasses with a camera.

The sensor-based device 604 can be used to collect data from the device 602. For example, the sensor-based device 604 can be used to collect images of food inside the refrigerator. The sensor-based device 604 can further transmit the collected data to the user device 606. The user device 606 can analyze the collected data to determine whether one or more reduceable item of the device 602 can be replenished. The user-based device can use various techniques to determine whether one or more reduceable item of the device 602 can be replenished. The techniques can be based upon a type of data collected. For example, if audio data is collected, the techniques can relate to an audio analysis, or if the image data is collected, the techniques can relate to image analysis.

In some embodiments, the user device 606 can include circuitry configured for machine learning. The machine learning functionality can be characterized by training and use of a model. A generic machine learning model can be trained through the use of training data to recognize one or more reducible item and predict a quantity and/or quality of the reduceable item. The training can be supervised, in which training data instances are labeled with object classes, or unsupervised, in which training instances do not include labels for object classes. A trained model can be deployed for the user device 606. The user device 606 can further receive data from the sensor-based device 604. The user device can further preprocess the collected data to be used as an input for the trained machine learning model. The trained machine learning model can process the collected data through a series of interconnected nodes and make a prediction as the identity of an object, a quantity of the object, and the quality of the object.

For example, the machine learning model can be implemented as a convolutional neural network (CNN) that is trained to predict object classes, quantity, and quality from images. The device 602 can be a refrigerator, the sensor-based device 604 can be an image capturing device, and the user device 606 can be a smartphone. The image-capturing device 604 can be used to scan images of the inside of the refrigerator. The image-capturing device 604 can further transmit the images to the user device 606. The user device 606, and in particular a transaction application, can use the CNN to analyze the images collected by the image-capturing device 604. Based on the analysis, the CNN can identify reduceable items (e.g., food items), a number of items (e.g., number of apples), and a quality of the apples (e.g., are the apples ripe, rotten). The transaction application can then determine whether to initiate a transaction with a source (e.g., an online produce seller) based on the analysis.

In some embodiments, in addition to sensor analysis, the transaction application can use a machine learning model to determine whether to initiate a transaction. For example, the transaction application can be configured to continuously collect user data from the user device 606 and an application executing on the user device 606. For example, the transaction application can collect various data, such as time of use, location, health-related data from a health application, transaction data from a payment application, and other appropriate data. The transaction application can further use this information in combination with the user-based criteria to determine whether to initiate a transaction with a source.

For example, the transaction application can collect data suggesting that the frequency that the user uses the payment application to purchase fast food is decreasing. The transaction application can further collect data from a health application that the user is taking cholesterol medication. The machine earning model can be trained to determine that inputs such as these suggest that the user is becoming more health conscious. Therefore, when ranking sources, the transaction application can factor in the health attributes of an item, even though the user has not inputted health attributes as a user-based criteria.

Figure 7:
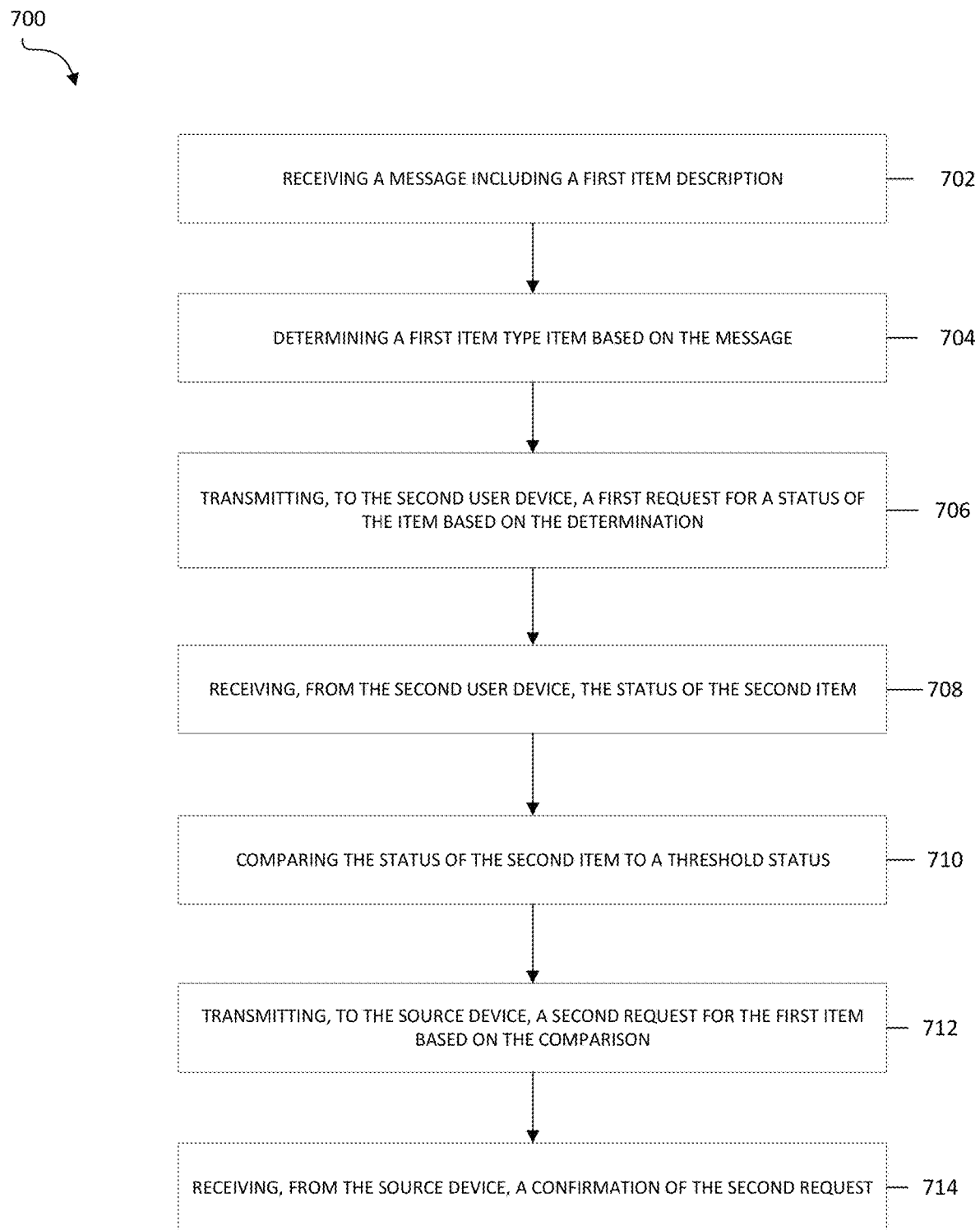
FIG. 7 is a process flow for effectuating a transaction by an intermediary, according to one or more embodiments.

FIG. 7 is a process flow 700 for effectuating a transaction by an intermediary, according to one or more embodiments. At 702, the method can include a background process of a first computing device receiving, a message comprising a description of a first item, the message received from a source device, the message being hidden by the background process from being presented on the first user device. The first computing device can be any computing device operable to be in communication with a second computing device. The first computing device can be in communication with the second computing device through various methods, such as Wi-Fi, wired connection, Bluetooth, near field communication (NFC). The item can be associated with a second computing device. For example, the second device can be a smart device and the item can be a reduceable item consumed by the second computing device or stored by the second computing device for consumption by others (e.g., printer ink, food items). The message is received by a background process executing on the first computing device. In this sense, the user does not have to view the information. Later in the process, if the first computing device can present an option to the user to initiate a transaction.

At 704, the method can include the background process of the first computing device determining a first item type based on the message. The determination can be made, for example, by applying natural language processing techniques to the message and extracting key words that describe the item. The background process can further determine synonyms for the keywords. In some embodiments, the background process can further use a data structure, such as a table, to associate the keywords and synonyms to items associated with the second computing device or a third user computing device.

At 706, the method can include the background process of the first computing device transmitting, by the background process of the first user device and to the second user device, a first request for a status of a second item based at least in part on the determination. For example, if the second computing device is a printer and the first item is ink, the background process can request a status of the amount of ink left in the printer.

At 708, the method can include the background process of the first computing device receiving, from the second user device, the status of the second item, wherein the status is hidden by the background process from being presented on the first user device. In this sense, the user does not need to be informed that an ink offer has been provided and that the first computing device is determining the amount of ink left in the printer.

At 710, the method can include the background process of the first computing device comparing the status of the second item to a threshold status. The threshold status can be determined by a user and provide the background device with information as to whether to request the first item from the source. For example, the threshold status can be a minimum amount of ink left in the printer before the background process is authorized to transact for additional ink.

At 712, the method can include the background process of the first computing device transmitting, to the source device, a second request for the first item based at least in part on the comparison. If the status of the second item was less than the threshold status, the background process can transact for the first item. For example, if the printer has less than a threshold amount of ink left, the background process can transact for additional ink. At 714, the method can include the background process receiving a confirmation of the second request from the source device. Upon receipt of the confirmation, the background process can interact with a payment application on the first user device and effectuate the transaction with the source device. For example, the background process can provide payment information to the source device effectuate the transaction.

Figure 8:
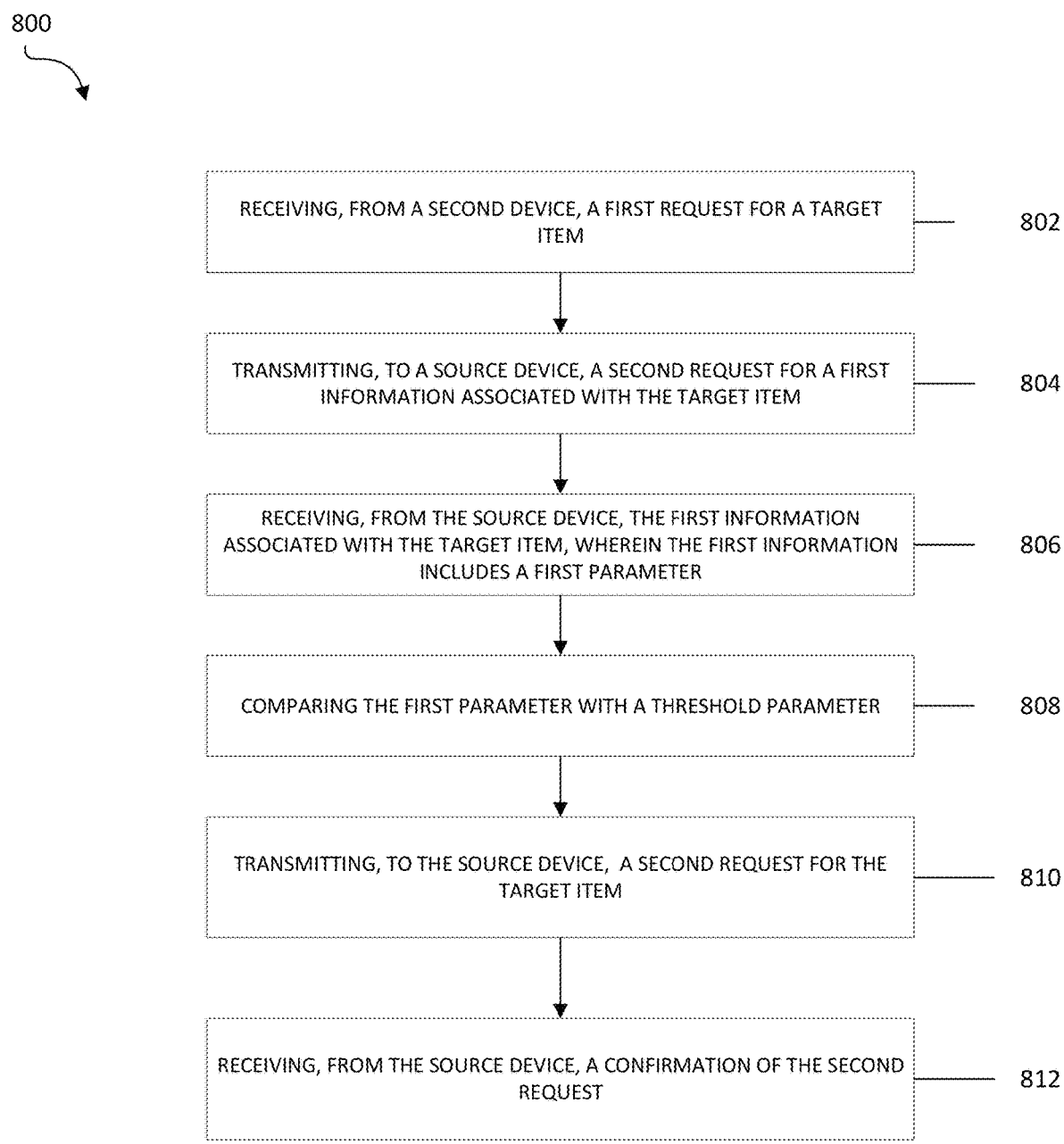
FIG. 8 is a process flow for effectuating a transaction by an intermediary, according to one or more embodiments.

FIG. 8 is a process flow 800 for effectuating a transaction by an intermediary, according to one or more embodiments. At 802, the method can include a background process of a first computing device receiving, from a second computing, a first request for a target item, the second user device being associated with the target item, the first request being hidden by the background process from being presented on the first user device. The first computing device can be a user device, such as a smart phone, tablet, or personal computer. The second computing device can also be a user device, such as a smart refrigerator or smart printer. The first message can include a request for a first item, where the first item can be associated with the second device. The target item can be associated with the second computing device, in that the second computing device consumes the target item to operate. For example, a printer used paper to produce printed documents.

At 804, the method can include the background process of the first computing device transmitting to a source device, a second request for first information associated with the target item. For example, if the target item is a subscription to a service executing on the second computing device, the request can be information for renewing the subscription.

At 806, the method can include the background process of the first computing device receiving, the first information associated with the first item. For example, referring to the example above, the first information can be an offer for renewal for the subscription service. The first information can include a first parameter, such as a price, delivery data, or other appropriate parameter.

At 808, the method can include the background process of the first computing device comparing the first parameter with a threshold parameter. The threshold parameter can be a user-defined parameter. For example, referring again to the example above, the first information can include a subscription price, and the threshold parameter can be the maximum price that the user is willing to pay for the subscription. The background process can compare the two values to determine whether it can transact for the renewal.

At 810, the method can include the background process of the first computing device transmitting a second request for the target item. At 812, the method can include the background process of the first computing device receiving a confirmation of the transaction. Upon receipt of the confirmation, the background process can interact with a payment application on the first user device and effectuate the transaction with the source device. For example, the background process can provide payment information to the source device effectuate the transaction.

Figure 9:
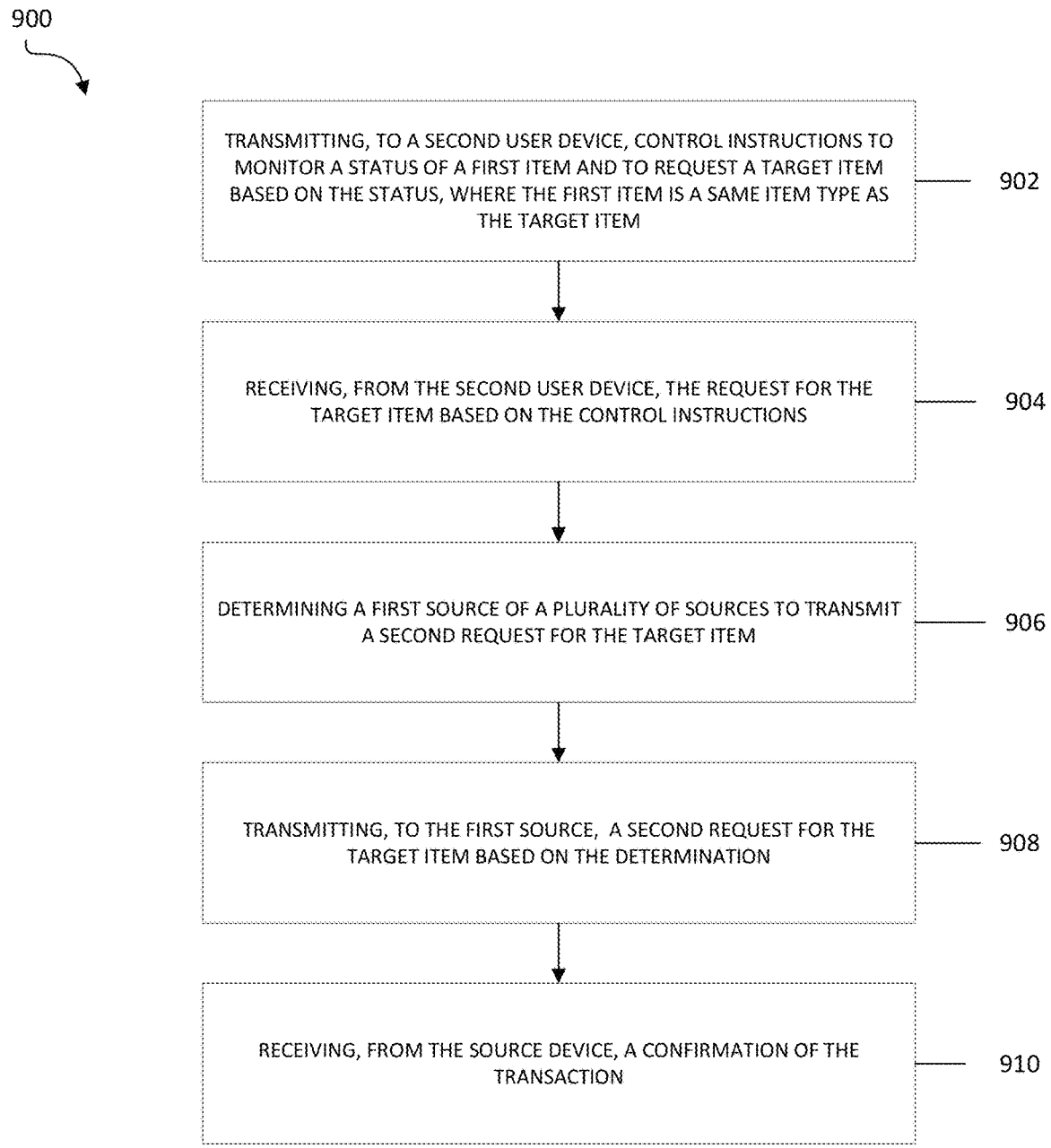
FIG. 9 is a process flow for effectuating a transaction by an intermediary, according to one or more embodiments.

FIG. 9 is a process flow 900 for effectuating a transaction by an intermediary, according to one or more embodiments. At 902, the method can include a background process of a first computing device transmitting control instructions configured to instruct the second user device to monitor a status of a first item, and to instruct the second user device to transmit a first request for a target item based at least in part on the status of the first item. The target item can be the same item type as the first item, the second user device being associated with the first item. For example, if the target item is an air filter for an air conditioning unit, the first item can also be an air filter. The first user device and the second user device being configured to communicate in the same environment. In other words, the first user device can be a smart phone of a homeowner and the second user device can be an air conditioning unit in the homeowner's home. Both devices can be connected and communicate with each other via a local area network.

At 904, the method can include the background process of the first computing device receiving, from the second user device, the first request for the target item based at least in part on the control instructions. The second computing device can monitor the status of the first item and based on the status make the request for the target item. For example, an air conditioning unit can monitor the quality of an air filter, and once the quality drops below a threshold quality, the air conditioning unit can request a new filter.

At 906, the method can include the background process of the first computing device determining a first source device of a plurality of source devices to transmit a second request for the target item, the plurality of source devices being identified based at least in part on a plurality of messages describing items having the same item type as the target item. The background process can analyze a plurality of information instances from a plurality of sources to determine a suitable source. For example, the background process can compare offers from multiple air filter sources based on various parameters such as price availability, reputation and other appropriate parameters. The background process can further determine whether the offers are compliant with any user defined parameters. Based on the analysis, the background process can select a source to transact for the air filter.

At 908, the method can include the first computing device receiving, via the background process, a second message. The second message can be received from the third computing device or the server device. The second message can include the information associated with the first item.

At 910, the method can include the background process of the first computing device transmitting a second request for the target item. At 912, the method can include the background process of the first computing device receiving a confirmation of the transaction. Upon receipt of the confirmation, the background process can interact with a payment application on the first user device and effectuate the transaction with the source device. For example, the background process can provide payment information to the source device effectuate the transaction.

Figure 10:
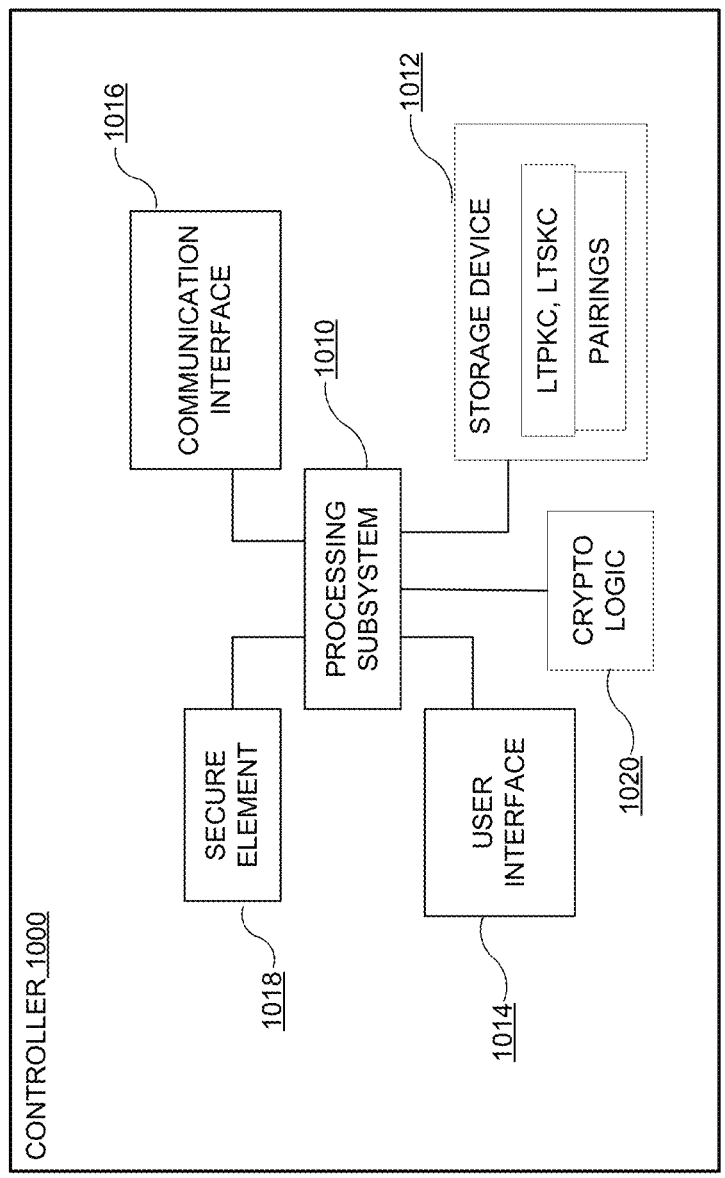
FIG. 10 is a block diagram of a user device, according to one or more embodiments.

FIG. 10 is a block diagram of a user device 1000, according to one or more embodiments. User device 1000 can implement any or all of the functions, behaviors, and capabilities described herein, as well as other functions, behaviors, and capabilities not expressly described. User device 1000 can include processing subsystem 1010, storage device 1012, user interface 1014, communication interface 1016, secure element 1018, and cryptographic logic module 1020. User device 1000 can also include other components (not explicitly shown) such as a battery, power controllers, and other components operable to provide various enhanced capabilities. In various embodiments, user device 1000 can be implemented in a desktop computer, laptop computer, tablet computer, smart phone, wearable computing device, or other systems having any desired form factor. Further, as noted above, user device 1000 can be implemented partly in a base station and partly in a mobile unit that communicates with the base station and provides a user interface.

Storage device 1012 can be implemented, e.g., using disk, flash memory, or any other non-transitory storage medium, or a combination of media, and can include volatile and/or nonvolatile media. In some embodiments, storage device 1012 can store one or more application and/or operating system programs to be executed by processing subsystem 1010, including programs to implement any or all operations described herein as being performed by a controller. For example, storage device 1012 can store a uniform controller application that can read an accessory definition record and generate a graphical user interface for controlling the accessory based on information therein. In some embodiments, portions (or all) of the controller functionality described herein can be implemented in operating system programs rather than applications. In some embodiments, storage device 1012 can also store apps designed for specific accessories or specific categories of accessories (e.g., transacting with a source on behalf of a smart device).

User interface 1014 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital to analog or analog to digital convertors, signal processors, or the like). A user can operate input devices of user interface 1014 to invoke the functionality of user device 1000 and can view and/or hear output from user device 1000 via output devices of user interface 1014.

Processing subsystem 1010 can be implemented as one or more integrated circuits, e.g., one or more single core or multi core microprocessors or microcontrollers, examples of which are known in the art. In operation, processing system 1010 can control the operation of user device 1000. In various embodiments, processing subsystem 1010 can execute a variety of programs in response to program code and can maintain multiple concurrently executing programs or processes. At any given time, some or all of the program code to be executed can be resident in processing subsystem 1010 and/or in storage media such as storage device 1012.

Through suitable programming, processing subsystem 1010 can provide various functionality for user device 1000. For example, in some embodiments, processing subsystem 1010 can implement various processes (or portions thereof) described above as being implemented by a controller. Processing subsystem 1010 can also execute other programs to control other functions of user device 1000, including programs that may be stored in storage device 1012. In some embodiments, these programs may interact with an accessory, e.g., by generating messages to be sent to the accessory and/or receiving messages from the accessory. Such messages can conform to a uniform accessory protocol as described above.

Communication interface 1016 can provide voice and/or data communication capability for user device 1000. In some embodiments communication interface 1016 can include radio frequency (RF) transceiver components for accessing wireless voice and/or data networks (e.g., using cellular telephone technology, data network technology such as 3G, 4G/LTE, Wi Fi (IEEE 802.11 family standards), or other mobile communication technologies, or any combination thereof), components for short range wireless communication (e.g., using Bluetooth and/or Bluetooth LE standards, NFC, etc.), and/or other components. In some embodiments communication interface 1016 can provide wired network connectivity (e.g., Ethernet) in addition to or instead of a wireless interface. Communication interface 1016 can be implemented using a combination of hardware (e.g., driver circuits, antennas, modulators/demodulators, encoders/decoders, and other analog and/or digital signal processing circuits) and software components. In some embodiments, communication interface 1016 can support multiple communication channels concurrently, using the same transport or different transports.

Secure element 1018 can be an integrated circuit or the like that can securely store cryptographic information for user device 1000. Examples of information that can be stored within secure element 1018 include the controller's long-term public and secret keys (LTPKC, LTSKC as described above), and a list of paired accessories (e.g., a lookup table that maps accessory ID to accessory long term public key LTPKA for accessories that have completed a pair setup or pair add process as described above).

In some embodiments, cryptographic operations can be implemented in a cryptographic logic subsystem 1020 that communicates with secure element 1018. Physically, cryptographic logic module 1020 can be implemented in the same integrated circuit with secure element 1018 or a different integrated circuit (e.g., a processor in processing subsystem 1010) as desired. Cryptographic logic module 1020 can include various logic circuits (fixed or programmable as desired) that implement or support cryptographic operations of user device 1000, including any or all cryptographic operations described above. Secure element 1018 and/or cryptographic logic module 1020 can appear as a "black box" to the rest of user device 1000. Thus, for instance, communication interface 1016 can receive a message in encrypted form that it cannot decrypt and can simply deliver the message to processing subsystem 1010. Processing subsystem 1010 may also be unable to decrypt the message, but it can recognize the message as encrypted and deliver it to cryptographic logic module 1020. Cryptographic logic module 1020 can decrypt the message (e.g., using information extracted from secure element 1018) and determine what information to return to processing subsystem 1010. As a result, certain information can be available only within secure element 1018 and cryptographic logic module 1020. If secure element 1018 and cryptographic logic module 1020 are implemented on a single integrated circuit that executes code only from an internal secure repository, this can make extraction of the information extremely difficult, which can provide a high degree of security. Other implementations are also possible.

Thus, although specific embodiments have been described, it will be appreciated that embodiments may include all modifications and equivalents within the scope of the following claims.

As described above, one aspect of the present technology is the gathering and use of data available from specific and legitimate sources to improve the delivery of messages from one device to one or more devices. The present disclosure contemplates that in some instances, this gathered data may include personal information data that uniquely identifies or may be used to identify a specific person. Such personal information data may include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, may be used to the benefit of users. For example, the personal information data may be used to deliver a command from a user profile on a computing device to one or more computing devices. Further, other uses for personal information data that benefit the user are also contemplated by the present disclosure. For instance, specific states of devices (e.g., medical care related devices, fitness devices, etc.) associated with the user may be transmitted from a device back to the user profile.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities may subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements may be provided to prevent or block access to such personal information data. For example, such as in the case of token generation services, the present technology may be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Illustrative techniques for using a computing device to delegate authority to generate a token from an owner to a sharing platform and provisioning the token by the sharing platform. Some or all of these techniques may, but need not, be implemented at least partially by as those shown at least in FIGS. 1-9 above. While many of the embodiments are described above with reference to computing devices and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for effectuating a transaction by a first user device in an Internet of Things (IoT) system, the method comprising:
   receiving, by a background process of a transaction application in the first user device, a message comprising a description of a first item, the message received from a source device;
   determining, by the background process of the transaction application in the first user device, a first item type based at least in part on the message;
   transmitting, by the background process of the transaction application in the first user device and to a second user device, a first request for a status of a second item based at least in part on the determination, the second user device being configured to communicate with the first user device in a same environment as the first user device, wherein the transaction application is operable to execute in an automatic mode or a manual mode;
   receiving, by the background process of the transaction application in the first user device and from the second user device, the status of the second item;
   comparing, by the background process of the transaction application in the first user device, the status of the second item to a threshold status;
   transmitting, by the background process of the transaction application in the first user device and to the source device, a second request for the first item based at least in part on the comparison; and
   receiving, by the background process the transaction application in the first user device and from the source device, a confirmation of the second request.

2. The method of claim 1, wherein the method further comprises:
   determining whether the first item is associated with the second user device based at least in part on the item type; and
   transmitting the request for status to the second user device based at least in part on the first item being associated with the second user device.

3. The method of claim 1, wherein the status comprises a quantity of the second item or a quality of the second item.

4. The method of claim 1, wherein the method further comprises:
   determining an authorization level of the background process to transmit the second request to the source device;
   presenting, via a user interface (UI), the first item to a user and a prompt requesting whether the user authorizes the second request based at least in part on the authorization level;
   receiving, via the user interface (UI), an input indicating whether the user authorizes the second request; and
   transmitting the second request based at least in part on the input.

5. The method of claim 1, wherein the second user device comprises a sensor device, wherein the status of the second item is received based at least in part on an output of a machine learning algorithm configured to determine the status of the second item based at least in part on data collected by the second user device, and wherein the second item is associated with a third user device.

6. The method of claim 1, wherein the message comprising the description of a first item is received from the source via a server, wherein the server is associated with the background process, and wherein the server is configured to determine whether a parameter included in the message is compliant with a user-defined parameter prior to transmitting the message to the first user device.

7. The method of claim 1, wherein transmitting the second request is based at least in part on a user-defined parameter.

8. A first user device for effectuating a transaction in an Internet of Things (IoT) system, the first user device, comprising:
   a processor; and
   a computer-readable medium including instructions that, when executed by the processor, cause the processor to perform operations comprising:
      receiving, by a background process of a transaction application in the first user device, a message comprising a description of a first item, the message received from a source device;
      determining, by the background process of the first user device, whether the first item is associated with a second user device based at least in part on the message, the second user device being configured to communicate with the first user device in a same environment as the first user device, wherein the transaction application is operable to execute in an automatic mode or a manual mode;

transmitting, by the background process of the transaction application in the first user device and to the second user device, a first request for a status of a second item based at least in part on the determination;

receiving, by the background process of the transaction application in the first user device and from the second user device, the status of the second item;

comparing, by the background process of the transaction application in the first user device, the status of the second item to a threshold status;

transmitting, by the background process the transaction application in the first user device and to the source device, a second request for the first item based at least in part on the comparison; and receiving, by the background process the transaction application in the first user device and from the source device, a confirmation of the second request.

9. The first user device of claim 8, wherein the instructions that, when executed by the processor, further cause the processor to perform operations comprising:

determining whether the first item is associated with the second user device based at least in part on the item type; and transmitting the request for status to the second user device based at least in part on the first item being associated with the second user device.

10. The first user device of claim 8, wherein the status comprises a quantity of the second item or a quality of the second item.

11. The first user device of claim 8, wherein the instructions that, when executed by the processor, further cause the processor to perform operations comprising:

determining an authorization level of the background process to transmit the second request to the source device;

presenting, via a user interface (UI), the first item to a user and a prompt requesting whether the user authorizes the second request based at least in part on the authorization level;

receiving, via the user interface (UI), an input indicating whether the user authorizes the second request; and transmitting the second request based at least in part on the input.

12. The first user device of claim 8, wherein the second user device comprises a sensor device, wherein the status of the second item is received based at least in part on an output of a machine learning algorithm configured to determine the status of the second item based at least in part on data collected by the second user device, and wherein the second item is associated with a third user device.

13. The first user device of claim 8, wherein the message comprising the description of a first item is received from the source via a server, wherein the server is associated with the background process of the transaction application in the first user device, and wherein the server is configured to determine whether a parameter included in the message is compliant with a user-defined parameter prior to transmitting the message to the first user device.

14. The first user device of claim 8, wherein transmitting the second request is based at least in part on a user-defined parameter.

15. A non-transitory computer-readable medium including stored thereon a sequence of instructions that, when executed by a processor of a cloud infrastructure node effectuates a transaction in an Internet of Things (IoT) system, causes the processor to perform operations comprising:

receiving, by a background process of a transaction application in a first user device, a message comprising a description of a first item, the message received from a source device;

determining, by the background process of the transaction application in the first user device, whether the first item is associated with a second user device based at least in part on the message, the second user device being configured to communicate with the first user device in a same environment as the first user device, wherein the transaction application is operable to execute in an automatic mode or a manual mode;

transmitting, by the background process of the transaction application in the first user device and to the second user device, a first request for a status of a second item based at least in part on the determination;

receiving, by the background process of the transaction application in the first user device and from the second user device, the status of the second item;

comparing, by the background process of the transaction application in the first user device, the status of the second item to a threshold status;

transmitting, by the background process the transaction application in the first user device and to the source device, a second request for the first item based at least in part on the comparison; and receiving, by the background process the transaction application in the first user device and from the source device, a confirmation of the second request.

16. The non-transitory computer-readable medium of claim 15, wherein the instructions that, when executed by the processor, further cause the processor to perform operations comprising:

determining whether the first item is associated with the second user device based at least in part on the item type; and transmitting the request for status to the second user device based at least in part on the first item being associated with the second user device.

17. The non-transitory computer-readable medium of claim 15, wherein the status comprises a quantity of the second item or a quality of the second item.

18. The first user device of claim 8, wherein the instructions that, when executed by the processor, further cause the processor to perform operations comprising:

determining an authorization level of the background process to transmit the second request to the source device;

presenting, via a user interface (UI), the first item to a user and a prompt requesting whether the user authorizes the second request based at least in part on the authorization level;

receiving, via the user interface (UI), an input indicating whether the user authorizes the second request; and transmitting the second request based at least in part on the input.

19. The non-transitory computer-readable medium of claim 15, wherein the second user device comprises a sensor device, wherein the status of the second item is received based at least in part on an output of a machine learning algorithm configured to determine the status of the second item based at least in part on data collected by the second user device, and wherein the second item is associated with a third user device.

20. The non-transitory computer-readable medium of claim 15, wherein the message comprising the description of a first item is received from the source via a server, wherein the server is associated with the background process of the transaction application in the first user device, and wherein the server is configured to determine whether a parameter included in the message is compliant with a user-defined parameter prior to transmitting the message to the first user device.

* * * * *